US011337776B2

(12) United States Patent
Grant

(10) Patent No.: US 11,337,776 B2
(45) Date of Patent: May 24, 2022

(54) TIP FOR AN AIR ABRASION DENTAL TOOL

(71) Applicant: Medivance Instruments Limited, London (GB)

(72) Inventor: Sidney Grant, London (GB)

(73) Assignee: Medivance Instruments Limited, London (GB)

( * ) Notice: Subject to any disclaimer, the term of this patent is extended or adjusted under 35 U.S.C. 154(b) by 378 days.

(21) Appl. No.: 15/818,918

(22) Filed: Nov. 21, 2017

(65) Prior Publication Data
US 2018/0200024 A1 Jul. 19, 2018

(30) Foreign Application Priority Data
Nov. 21, 2016 (GB) ..................... 1619638

(51) Int. Cl.
*A61C 3/025* (2006.01)
*B24C 5/02* (2006.01)
*B24C 5/04* (2006.01)

(52) U.S. Cl.
CPC ............. *A61C 3/025* (2013.01); *B24C 5/02* (2013.01); *B24C 5/04* (2013.01)

(58) Field of Classification Search
CPC ........... A61C 3/025; A61C 3/02; A61C 17/00; B24C 5/02; B24C 5/04
USPC ................ 433/88–90; 451/90–91, 99, 102
See application file for complete search history.

(56) References Cited

U.S. PATENT DOCUMENTS

| 4,595,365 A * | 6/1986 | Edel ................. A61C 3/025 433/216 |
| 5,356,292 A | 10/1994 | Ho |
| 5,845,431 A * | 12/1998 | Waite ................ A01K 63/006 43/54.1 |
| 5,951,285 A | 9/1999 | Ho |
| 6,325,624 B1 | 12/2001 | Kutsch et al. |
| 6,382,972 B1 * | 5/2002 | Fischer ............... A61C 3/005 401/271 |
| 2003/0027100 A1 * | 2/2003 | Grant ................. A61C 3/025 433/88 |
| 2007/0021716 A1 * | 1/2007 | Hansen ............... A61M 5/30 604/68 |
| 2007/0042316 A1 | 2/2007 | Pichat et al. |

(Continued)

FOREIGN PATENT DOCUMENTS

| DE | 10331583 B3 | 7/2004 |
| EP | 1414366 | 10/2008 |

OTHER PUBLICATIONS

EPO Search Report, App. No. EP 17 20 2723, dated Aug. 30, 2018.

*Primary Examiner* — Yogesh P Patel
(74) *Attorney, Agent, or Firm* — Stout, Uxa & Buyan, LLP; Donald E. Stout

(57) ABSTRACT

According to an aspect of the present invention there is provided a tip for fitting to a nozzle of an air abrasion dental tool. The tip comprises a tip body having a central bore that extends through the length of the tip body from an inlet end to an outlet end. The inlet end of the tip body is configured to receive and form an interference fit with the nozzle of the dental tool. The outlet end of the central bore is provided with at least one flexible prong that extends outwardly from the outlet end in a direction that is substantially parallel to longitudinal axis of the central bore.

21 Claims, 5 Drawing Sheets

(56) References Cited

U.S. PATENT DOCUMENTS

| | | | | |
|---|---|---|---|---|
| 2008/0110923 A1* | 5/2008 | Segal | ............... | A61C 9/0026 |
| | | | | 222/1 |
| 2009/0092563 A1* | 4/2009 | Allred | ............... | A61C 19/066 |
| | | | | 424/53 |
| 2010/0304327 A1* | 12/2010 | Grez | ............... | A61C 17/02 |
| | | | | 433/88 |
| 2012/0045732 A1* | 2/2012 | Chen | ............... | A61C 19/063 |
| | | | | 433/90 |
| 2013/0288195 A1* | 10/2013 | Mueller | ............... | B05B 15/18 |
| | | | | 433/88 |
| 2014/0106299 A1* | 4/2014 | Walter | ............... | A61C 5/50 |
| | | | | 433/90 |

* cited by examiner

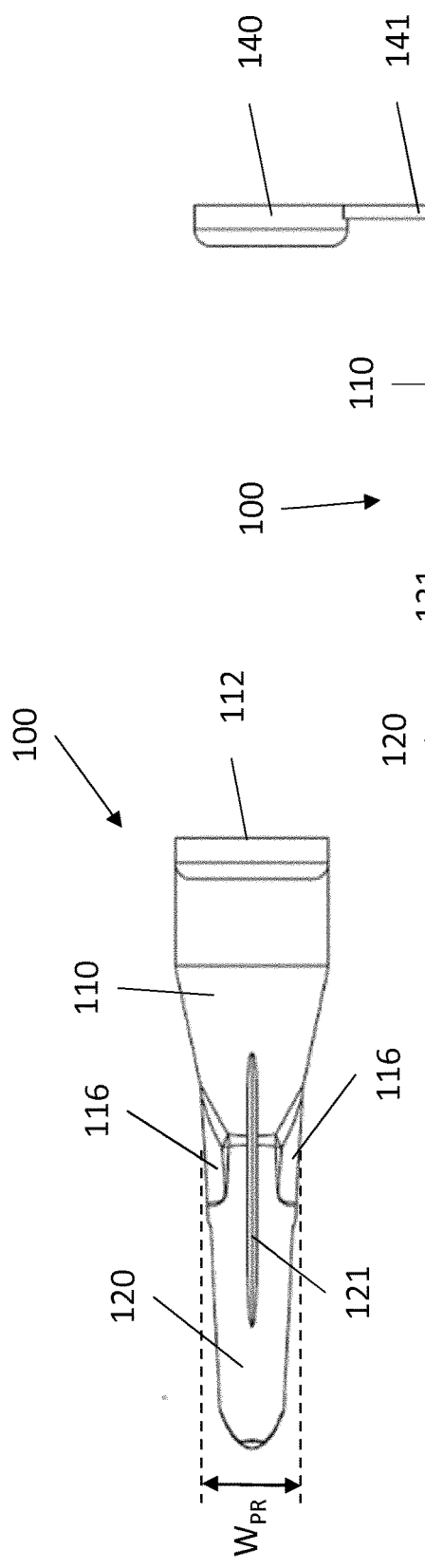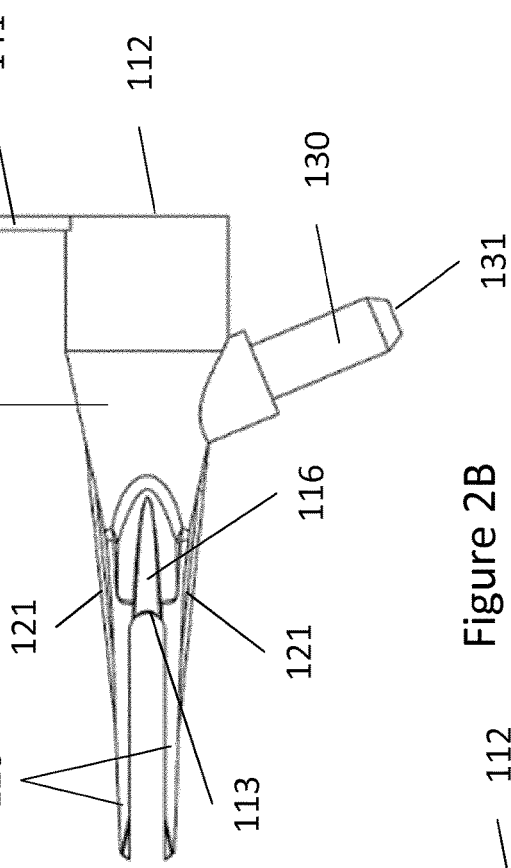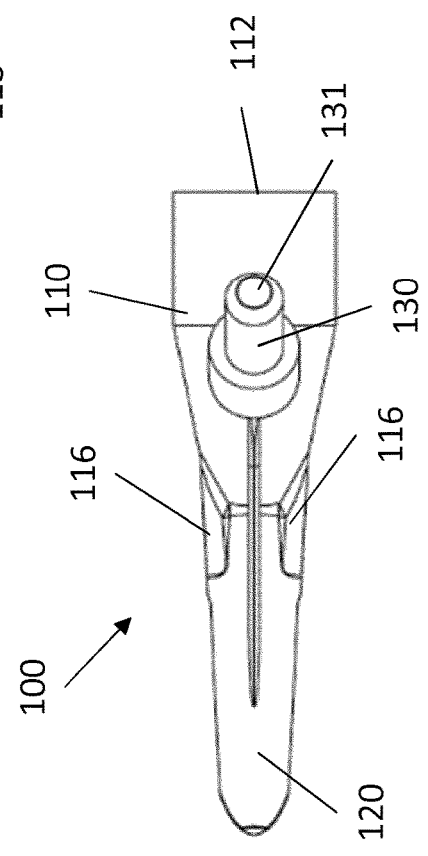
Figure 2A
Figure 2B
Figure 2C

TIP FOR AN AIR ABRASION DENTAL TOOL

TECHNICAL FIELD

This invention relates to a disposable tip for fitting to a nozzle of an air abrasion dental tool. In particular, the invention provides a disposable tip or fitting to a nozzle of an air abrasion dental tool that is particularly suited to use in interspatial/interproximal and subgingival locations.

BACKGROUND

EP1414366 discloses a dental tool comprising a body having a nozzle for providing a stream of pressurised gas containing abrasive media towards a tooth surface. A cap member is fitted to the outlet end of the nozzle that allows an unpressurised liquid to join the gas stream, with this liquid being shaped by the Venturi effect to form a wall about the gas stream and limit divergence thereof. In particular, the cap member is fitted to the outlet end of the nozzle such that a bore in the cap member is in axial alignment with the bore of the nozzle. The cap member also has a liquid supply pipe opening into the bore of the cap member rearwardly of the nozzle outlet in order to allow the unpressurised liquid to be drawn into the bore. The wall of the bore of the cap member that is in front of the nozzle is shaped so that liquid emerging from the outlet of the cap member is caused by the gas stream to form a wall of liquid about the gas stream moving towards the tooth surface.

The tip disclosed in EP1414366 functions well and has been designed to limit the divergence of the jet of gas and powder as it leaves the nozzle of the tool, thereby keeping the gas powder stream concentrated and focused on the surface to be worked on, which can increase the cutting effectiveness by up to almost 100%. This tip design also prevents the abrasive particles from being dispersed in the patient's mouth and airways and protects the wall of the bore of the cap member from abrasion by the abrasive media. However, it has become apparent that this existing tip design is not ideal when it is desirable to make use of a particle abrasion dental tool in interspatial/interproximal and subgingival areas.

In this regard, it is often desirable to be able to make use of a dental tool on those areas of the teeth that are located in the gaps between adjacent teeth (i.e. in the interspatial/interproximal spaces) and/or below the gum (gingival) margin in the crevice/groove between the free gingiva and the crown of the tooth (i.e. the gingival sulcus) and in any gingival and/or periodontal pocket. Conventional dental tools that are designed for use in these interspatial/interproximal and/or subgingival areas typically comprise a rigid tip or nozzle that is narrow and pointed so that they can be pushed into the space between adjacent teeth or between the tooth and the gum. However, these spaces are very narrow yet can have a depth from 1 mm to 9 mm and also follow the irregular shape of the tooth, such that it is difficult to work within these spaces even when using a specifically designed subgingival dental tool.

Consequently, it is desirable to provide a disposable tip/cap for fitting to a nozzle of an air abrasion/particle abrasion dental tool that is designed for use in interspatial/interproximal and/or subgingival locations and that is an improvement upon conventional dental tools.

SUMMARY

According to an aspect of the present invention there is provided a tip for fitting to a nozzle of an air abrasion dental tool. The tip comprises a tip body having a central bore that extends through the length of the tip body from an inlet end to an outlet end. The inlet end of the tip body is configured to receive and form an interference fit with the nozzle of the dental tool. The outlet end of the central bore is provided with at least one flexible prong that extends outwardly from the outlet end in a direction that is substantially parallel to longitudinal axis of the central bore.

The tip may be made from an injection mouldable plastics material such as polyurethane or polyethylene, and is preferably translucent or transparent.

Preferable, each prong has a hardness of between 30 to 80 on the Shore D hardness scale, and more preferably between 40 to 60 on the Shore D hardness scale. Preferably, the prongs are from 3 mm and 9 mm in length. A distal end of each prong may be rounded. Each prong may be tapered such that a proximal end is wider than a distal end.

The inlet end of the tip body is preferably configured to receive and form an interference fit with the nozzle of the dental tool such that the central bore of the tip body is axially aligned with a central bore of the nozzle. The interference fit may be provided by one or both of a tapered inner surface of the inlet end of the tip body and a gasket formed on the inner surface of the tip body adjacent to the inlet end of the tip body.

Preferably, the longitudinal axes of each prong is substantially parallel to longitudinal axis of the central bore. Preferably, the central bore of the tip body has a substantially circular or elliptical cross section. The tip may then comprise a plurality of prongs that are evenly distributed around the circumference of the central bore of the tip body. In one such embodiment, the outlet end of the central bore may be provided with two flexible prongs that are diametrically opposed to one another.

Preferably, each prong is provided with at least one external rib that extends at least partially along the length of the prong. Each external rib may extend along the majority of the length of the prong, and preferably at least partially along an external surface of the tip body. Preferably, each rib projects from an outer surface of the prong in a direction that is substantially perpendicular to the longitudinal axis of the prong. In one embodiment, each prong may be provided with one external rib and each rib is aligned with the longitudinal axis of the corresponding prong.

Preferably, tip body is provided with at least one external groove in the outer surface of the tip body, each groove being located adjacent to a prong with the longitudinal axis of the groove being substantially parallel to that of the adjacent prong. Each groove may extend from the outlet end of the tip body towards the inlet end of the tip body, at least partially along the length of the tip body. The depth of each groove may reduce as the groove extends towards the inlet end of the tip body. For each groove, a first end may be formed in the outlet end of the tip body and a second end formed partially along the length of the tip body.

The tip may further comprise a fluid supply channel providing a fluid inlet for connection to an external supply of fluid and a fluid outlet for supplying fluid into the central bore of the tip body. The fluid supply channel may be provided by any one of:

(a) a duct formed within the tip body and extending from a location adjacent to the inlet end of the tip body to a location on the inner surface of the central bore that is nearer to the outlet/ejection end of the central bore;

(b) a groove formed in the inner surface of the tip body and extending from a location adjacent to the inlet end of the tip body to a location that is nearer to the outlet end of the central bore; and (c) a branch conduit that projects away from the tip body, a central bore of the branch conduit opening into a side of the central bore of the tip body.

BRIEF DESCRIPTION OF THE DRAWINGS

Aspects of the present invention will now be further described, by way of example only, with reference to the accompanying figures.

FIG. 2A is a plan view of the example of FIG. 1;

FIG. 2B is a side view of the example of FIG. 1;

FIG. 2C is a view from beneath the example of FIG. 1;

DETAILED DESCRIPTION

Figure 1:
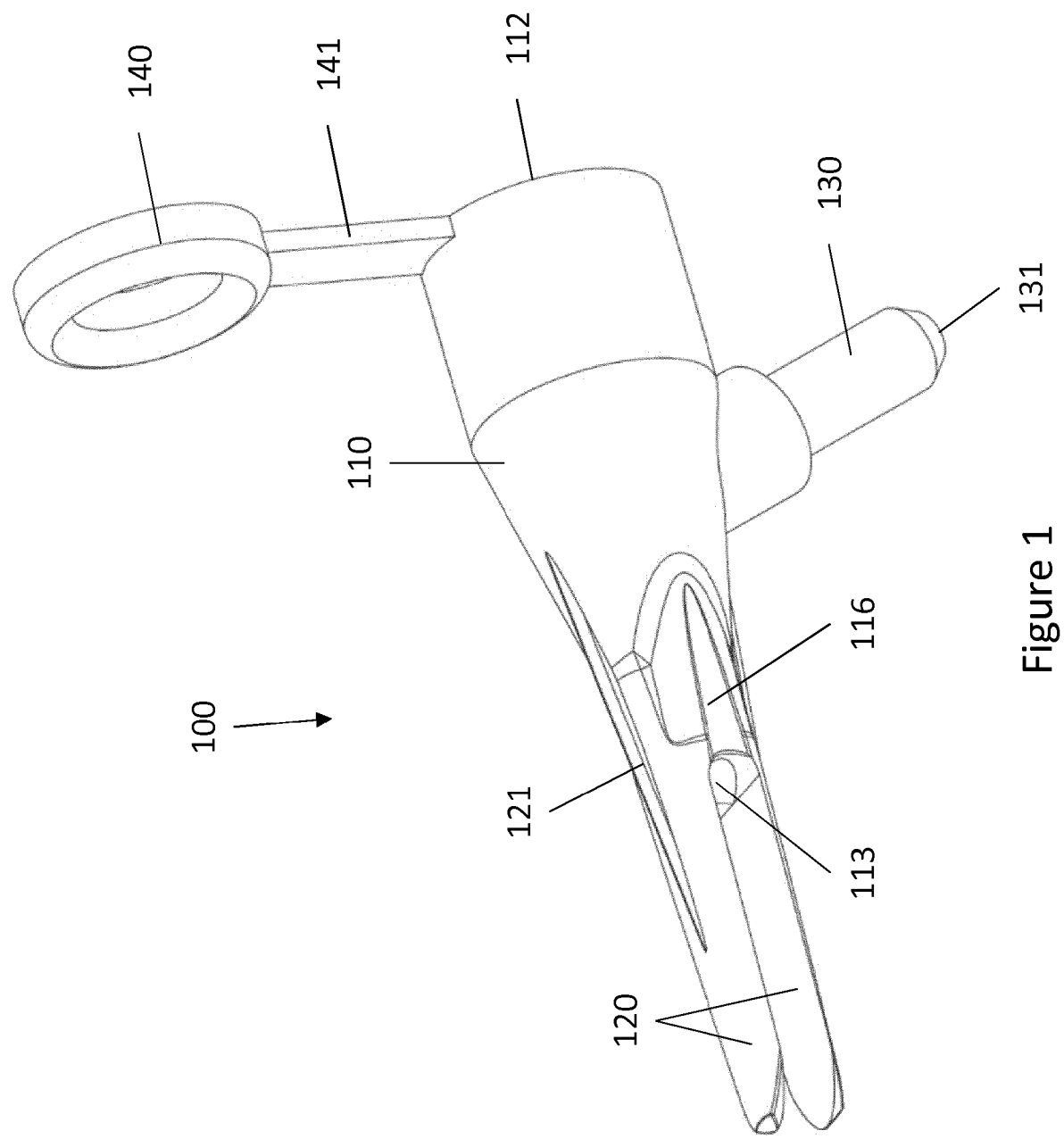
FIG. 1 is a perspective view of an example of a tip for fitting to a nozzle of an air abrasion dental tool as described herein.

FIGS. 1 to 5 illustrate an example of a disposable tip/cap 100 for fitting to a nozzle 210 of an air abrasion/particle abrasion dental tool 200, the tip 100 being particularly suited to use in interspatial/interproximal and/or subgingival locations. The tip 100 comprises a tip body 110 having a central bore 111 that extends through the length of the tip body 110 from an inlet end 112 to an outlet/ejection end 113. The inlet end 112 of the tip body 110 is configured to receive and form an interference fit with the nozzle 210 of an air abrasion dental tool 200. The outlet end 113 of the central bore 111 is provided with at least one flexible projection/arm/prong 120 that extends outwardly from the outlet end 113 in a direction that is substantially parallel to longitudinal axis of the central bore 111.

Preferably, each prong 120 has a hardness of between 30 to 80 on the Shore D hardness scale, and more preferably between 40 to 60 on the Shore D hardness scale. Given the dimensions of the tip 100 necessary for it to be used in interspatial/interproximal and/or subgingival locations, a hardness of between 30 to 80 on the Shore D hardness scale ensures that the prongs have sufficient structure to maintain their general shape whilst also providing sufficient flexibility and resilience to allow them to return to their original shape after being bent and/or twisted.

Providing the tip 100 with at least one flexible prong 120 that extends outwardly from the outlet end 113 allows for the prong(s) 120 to be guided into interspatial/interproximal and subgingival locations, whilst bending to conform with the curved surface of a tooth, and therefore assist in opening up these spaces to allow the material ejected from the outlet end 113 of the tip body 110 to enter. The flexibility of the prongs 120 also provides improved comfort for the patient being treated when compared with conventional rigid interspatial/subgingival dental tools. Furthermore, the voids provided around the one or more prongs 120 provide spaces through which the material ejected from the outlet end 113 of the tip body 110 can vent backwards, away from any interspatial/subgingival spaces/pockets thereby preventing a build-up of pressure that would otherwise risk causing an embolism.

In preferred embodiments, the tip 100 comprises a plurality of prongs 120 (i.e. two or more) that are evenly distributed around the circumference of the central bore 111 of the tip body 110. In these preferred embodiments, insertion of the ends of the prongs 120 into a tight space will cause them to move toward one another, closing the ends of the prongs, with the gaps between adjacent prongs allowing the ejected material to vent sideways relative to the nozzle 210 rather than directly out forwards, providing further protection against pressure build-up. In addition, the flexibility and separation/unconnected nature of the prongs 120 also allows them to splay when pushed against a surface (such as the surface of a tooth) so that the tip 100 is equally effective in non-subgingival, non-interspatial locations. In this configuration, the splayed prongs 120 also cover some of the surfaces that are adjacent to the surface being worked by the dental tool, thereby assisting in protecting those adjacent surfaces from abrasion.

In the illustrated example, the tip 100 is provided with just two flexible prongs 120 that are diametrically opposed to one another. The width of a proximal end of the two prongs 120 is then preferably at least equal to the diameter of the central bore 111 of the tip body 110, and is more preferably equal to the width of the outlet/ejection end 113 of the tip body 110. The width of the prongs 120 serves to further limit the divergence/control the dispersion of the material ejected from the tip 100, whilst also ensuring that the prongs 120 have sufficient structure to maintain their general shape and sufficient resilience to allow them to return to their original shape after being bent and/or twisted.

Preferably, the tip 100 is made from an injection mouldable plastics material (i.e. thermoplastic or thermosetting plastics materials) such as polyurethane or polyethylene. Whilst the tip 100 could be made from an opaque material it is preferable that it is transparent or at least translucent to improve the view for the user.

The prongs 120 are preferably from 3 mm and 9 mm in length in order to allow them to reach into the full depth of a typical interspatial or subgingival space. However, as the prongs 120 are made from flexible materials, such as polyurethane or polyethylene, they can also easily be trimmed to a shorter length by a user. The ability to trim the prongs 120 allows the tip 100 to be used in a variety of circumstances, and even provides that the prongs 120 can be cut off in their entirety should the tip 100 only be required for non-subgingival, non-interspatial use.

Figure 3B:
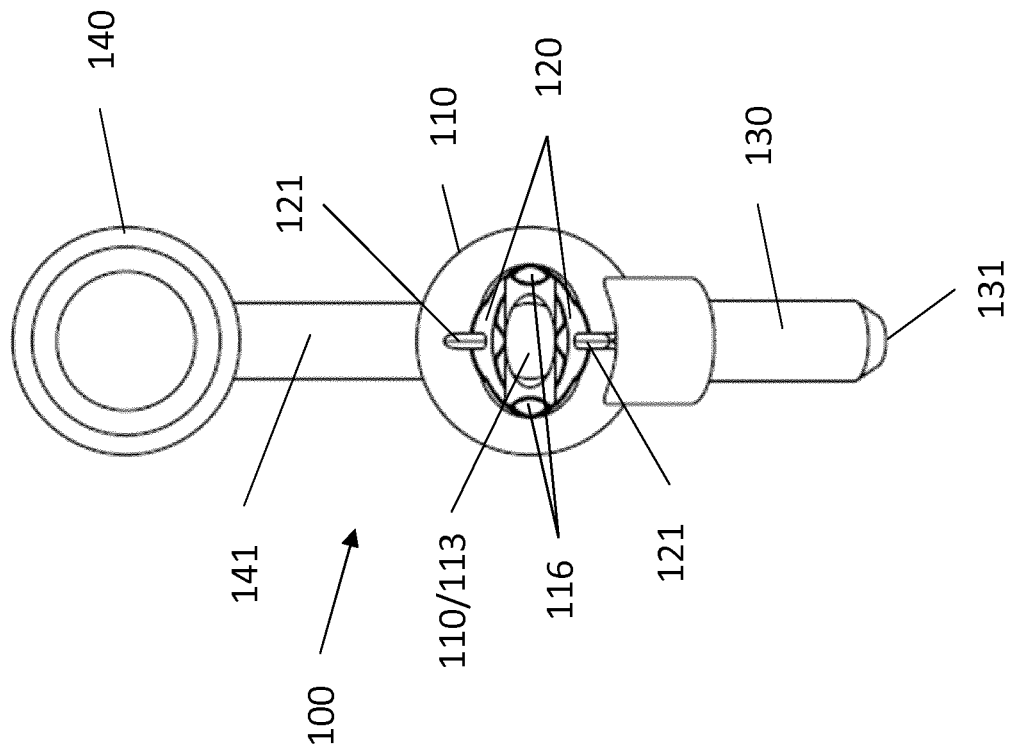
FIG. 3B is a view of the outlet end of the example of FIG. 1.
Figure 3A:
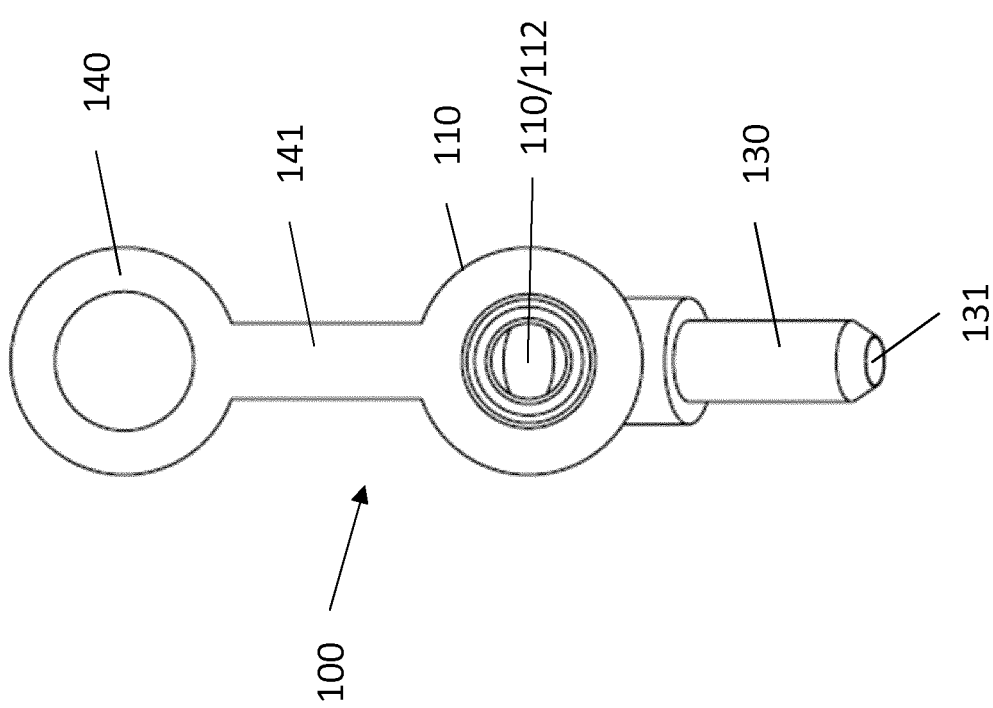
FIG. 3A is a view of the inlet end of the example of FIG. 1.
Figure 4:
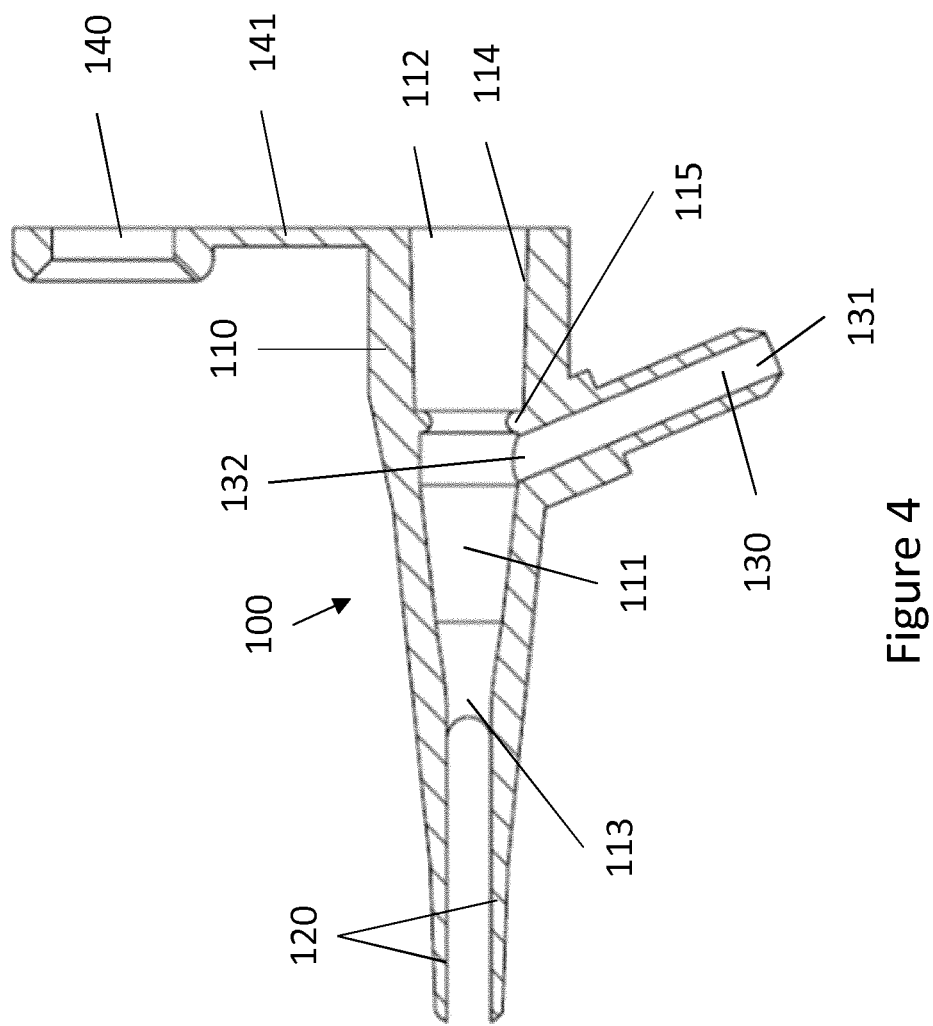
FIG. 4 is cross-sectional view of the example of FIG. 1.
Figure 5:
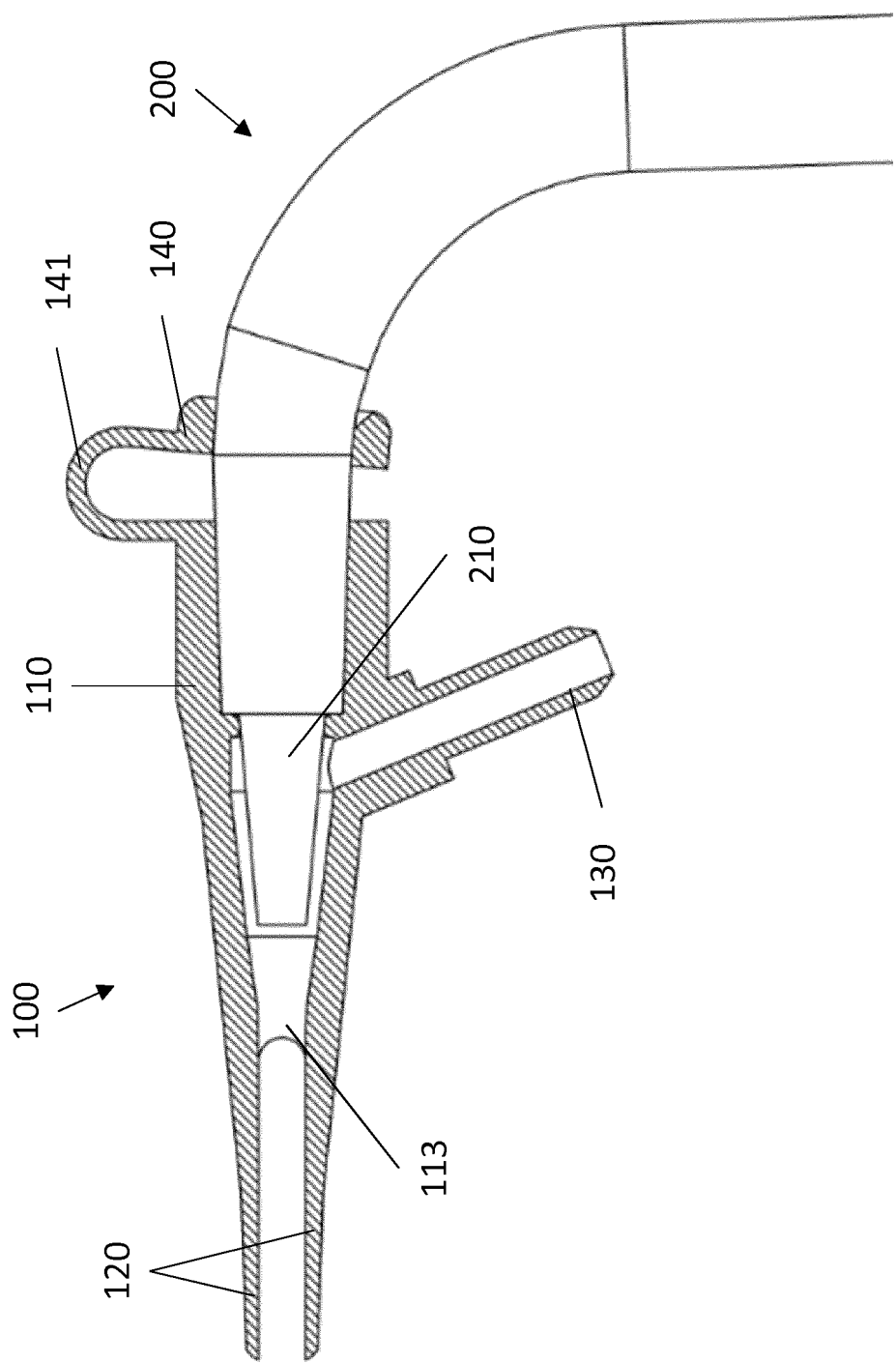
FIG. 5 is cross-sectional view of the example of FIG. 1 when the tip is fitted to the nozzle of an air abrasion dental tool.

The inlet end 112 of the tip body 110 is configured to receive and form an interference fit with the nozzle 210 of the dental tool 200 such that the central bore 111 of the tip body 110 is axially aligned with a central bore/outlet of the nozzle 210. By way of example, this interference fit could be provided by one or both of a tapered inner surface 114 of the inlet end 112 of the tip body 110 and a gasket formed 115 on the inner surface of the tip body 110 adjacent to the inlet end 112 of the tip body 110. As can be seen in FIGS. 3 and 5, in the illustrated example, the tip 100 is provided with both a tapered inner surface 114 at the inlet end 112 of the tip body 110 and a gasket 115 on the inner surface of the tip body 110 adjacent to the inlet end 112 of the tip body 110. The tapered inner surface 114 provides an interference fit for retaining the tip 100 on the nozzle 210 and provides that a seal is formed between the tip 100 and the nozzle 210. The gasket 115 then further improves this interference fit whilst also significantly improving the seal.

In the illustrated example, the central bore 111 of the tip body 110 has a substantially circular or elliptical cross section. A circular or elliptical cross section provides that there are no corners or potential dead zones within the central bore 111 that could negatively impact on the flow of material ejected from the tip 100.

In the illustrated example, the distal end of each prong 120 is rounded/curved. In addition, each prong 120 is tapered such that a proximal end is wider than a distal end. This provides that shape of each prong 120 allows for it to be easily and comfortably guided into a subgingival/interspatial space.

In the illustrated example, the inner surface of each of prong 120 (i.e. the inward facing surface) is substantially flat/planar. However, this surface could equally be curved, although in this case it would then be preferable that the surface be concave as opposed to convex.

In preferred embodiments, each prong 120 is provided with at least one external rib/vane/fin 121 that extends longitudinally, at least partially along the length of the prong 120. Each rib 121 projects from an outer surface of the prong 120 in a direction that is substantially perpendicular to the longitudinal axis of the prong 120. Preferably, and as shown in the illustrated example, each external rib 121 extends along the majority of the length of the prong 120 and at least partially along an external surface of the tip body 110. The ribs 121 provided on the prongs 120 provide some support and additional rigidity to the prongs 120 without significantly limiting their flexibility. In addition, these narrow ribs 121 also act as spacers that provide additional space around the prongs 120 for the ejected material to circulate. In the illustrated example, each prong 120 is provided with one external rib 121 and each rib 121 is aligned with the longitudinal axis of the corresponding prong 120.

In preferred embodiments, the tip body 110 is also provided with at least one external groove/channel 116 that in the outer surface of the tip body 110. Each groove 116 extends longitudinally from the outlet end 113 of the tip body 110 towards the inlet end 112 of the tip body 110, at least partially along the length of the tip body 110. Each groove 116 is located adjacent to a prong 120, with the longitudinal axis of the groove 116 being substantially parallel to that of the adjacent prong 120. The edge of a groove 116 is therefore contiguous with the edge of an adjacent prong 120. In the illustrated example, each groove 116 is aligned with the gap between adjacent prongs 120. These groves 116 provide additional channels through which the ejected material can vent away from the tip 100 to prevent any build-up of pressure within subgingival/interspatial spaces.

In the illustrated example, each groove 116 has a substantially arc shaped cross-section. The depth of each groove 116 reduces as the groove 116 extends towards the inlet end 112 of the tip body 110. In particular, for each groove 116, a first end is formed in the outlet end 113 of the tip body 110 and a second end is formed partially along the length of the tip body 110, and the first end of the groove 116 is then deeper than the second end.

The tip 100 also further comprises a fluid supply channel 130 that provides a fluid inlet 131 for connection to an external supply of fluid and a fluid outlet 132 for supplying fluid into the central bore 111 of the tip body 110. In particular, the position of both the fluid inlet 131 and the fluid outlet 132 are selected so that suction is generated by the Venturi effect of gas flowing out of the nozzle 210 of the dental tool 200. This suction then causes fluid to be drawn from the fluid supply channel 130 into the central bore 111 of the tip body 110. The tip 100 therefore provides the same functions as the tip disclosed in EP1414366.

In the illustrated example, the fluid supply channel 130 is provided by a branch conduit that projects away from the tip body 110, a central bore of the branch conduit opening into a side of the central bore 111 of the tip body 110. The longitudinal axis of the branch conduit is at an angle of from 50 degrees to 90 degrees relative to the longitudinal axis of the central bore 111 of the tip body 110. However, the fluid supply channel 130 could equally be provided by either a duct formed within the tip body 110 and extending from a location adjacent to the inlet end 112 of the tip body 110 to a location at the inner surface of the central bore 110 that is nearer to the outlet end 113 of the central bore 110, or a groove formed in the inner surface of the tip body 110 and extending from a location adjacent to the inlet end 112 of the tip body 110 to a location that is nearer to the outlet/ejection end 113 of the central bore 110.

In the illustrated example the tip 100 further comprises a retention eye 140 provided on the end of a flexible arm 141. As shown in FIG. 5, the flexible arm 141 can be folded so that the retention eye 140 is axially aligned with the inlet end 112 of the tip body 110. The nozzle 210 of a dental tool 200 can then be inserted through the retention eye 140 and into the central bore 110. The retention eye 140 therefore provides a failsafe that prevents the tip 100 from becoming entirely detached from the dental tool 200 when in use.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A tip for fitting to a nozzle of an air abrasion dental tool, the tip comprising:
   a tip body having a central bore that extends through the length of the tip body from an inlet end to an outlet end;
   wherein the inlet end of the tip body is configured to receive and form an interference fit with the nozzle of the dental tool; and
   wherein the outlet end of the central bore is provided with a plurality of flexible diametrically opposed prongs that extend outwardly from the outlet end in a direction that is substantially parallel to a longitudinal axis of the central bore with a gap between them to define voids to provide space for venting backwards and/or sideways in order to eject material rather than directly forwards when the prongs splay, a distal end of each flexible prong of the tip being rounded and each flexible prong comprising a substantially flat inward facing surface.

2. The tip according to claim 1, wherein the inlet end of the tip body is configured to receive and form an interference fit with the nozzle of the dental tool such that the central bore of the tip body is axially aligned with a central bore of the nozzle.

3. The tip according to claim 1, wherein the interference fit is provided by one or both of:
   a tapered inner surface of the inlet end of the tip body; and
   a gasket formed on the inner surface of the tip body adjacent to the inlet end of the tip body.

4. The tip according to claim 1, wherein the longitudinal axis of each of the flexible prongs is substantially parallel to the longitudinal axis of the central bore.

5. The tip according to claim 1, wherein the central bore of the tip body has a substantially circular or elliptical cross section.

6. The top according to claim 5, wherein the plurality of flexible prongs are evenly distributed around the circumference of the central bore of the tip body.

7. A tip for fitting to a nozzle of an air abrasion dental tool, the tip comprising:
   a tip body having a central bore that extends through the length of the tip body from an inlet end to an outlet end;
   the inlet end of the tip body being configured to receive and form an interference fit with the nozzle of the dental tool;
   the outlet end of the central bore being provided with exactly two flexible prongs that extend outwardly from the outlet end in a direction that is substantially parallel to a longitudinal axis of the central bore, a distal end of each flexible prong of the tip being rounded; and
   wherein the flexible prongs are diametrically opposed to one another at the outlet end of the central bore.

8. The tip according to claim 1, wherein each flexible prong is tapered such that a proximal end thereof is wider than a distal end thereof.

9. The tip according to claim 1, wherein each flexible prong is provided with at least one external rib that extends at least partially along the length of the flexible prong.

10. The tip according to claim 9, wherein each external rib extends along the majority of the length of one of the flexible prongs, and at least partially along an external surface of the tip body.

11. The tip according to claim 9, wherein each external rib projects from an outer surface of the corresponding flexible prong in a direction that is substantially perpendicular to the longitudinal axis of the flexible prong.

12. The tip according to claim 1, wherein each one of the plurality of flexible prongs is provided with one external rib and each rib is aligned with a longitudinal axis of the corresponding flexible prong.

13. The tip according to claim 1, wherein the tip body is provided with at least one external groove in the outer surface of the tip body, each external groove being located adjacent to one of the plurality of flexible prongs with the longitudinal axis of the groove being substantially parallel to that of an adjacent flexible prong.

14. The tip according to claim 13, wherein each groove extends from the outlet end of the tip body towards the inlet end of the tip body, at least partially along the length of the tip body.

15. The tip according to claim 13, wherein a depth of each groove reduces as the groove extends towards the inlet end of the tip body.

16. The tip according to claim 13, wherein for each groove, a first end is formed in the outlet end of the tip body and a second end is formed partially along the length of the tip body.

17. The tip according to claim 1, and further comprising a fluid supply channel providing a fluid inlet for connection to an external supply of fluid and a fluid outlet for supplying fluid into the central bore of the tip body.

18. The tip according to claim 17, wherein the fluid supply channel is provided by any one of:
   a duct formed within the tip body and extending from a location adjacent to the inlet end of the tip body to a location on the inner surface of the central bore that is nearer to the outlet/ejection end of the central bore;
   a groove formed in the inner surface of the tip body and extending from a location adjacent to the inlet end of the tip body to a location that is nearer to the outlet end of the central bore; and
   a branch conduit that projects away from the tip body, a central bore of the branch conduit opening into a side of the central bore of the tip body.

19. The tip according to claim 1, wherein the tip is made from an injection moldable plastics material, and is translucent or transparent.

20. A tip for fitting to a nozzle of an air abrasion dental tool, the tip comprising:
   a tip body having a central bore that extends through the length of the tip body from an inlet end to an outlet end;
   the inlet end of the tip body being configured to receive and form an interference fit with the nozzle of the dental tool;
   the outlet end of the central bore being provided with a plurality of flexible prongs that extend outwardly from the outlet end in a direction that is substantially parallel to a longitudinal axis of the central bore, a distal end of each flexible prong of the tip being rounded; and
   wherein each flexible prong has a hardness of between 30 and 80 on the Shore D hardness scale, and between 40 and 60 on the Shore D hardness scale.

21. The tip according to claim 1, wherein the flexible prongs are from 3 mm and 9 mm in length.

* * * * *